US009673925B2

(12) United States Patent
Havinal

(10) Patent No.: US 9,673,925 B2
(45) Date of Patent: Jun. 6, 2017

(54) SYSTEM AND METHOD FOR MONITORING USER INTERACTIONS WITH A UNIVERSAL CONTROLLING DEVICE

(71) Applicant: UNIVERSAL ELECTRONICS INC., Santa Ana, CA (US)

(72) Inventor: Prahalladachar Havinal, Bangalore (IN)

(73) Assignee: Universal Electronics Inc., Santa Ana, CA (US)

( * ) Notice: Subject to any disclaimer, the term of this patent is extended or adjusted under 35 U.S.C. 154(b) by 537 days.

(21) Appl. No.: 14/189,406

(22) Filed: Feb. 25, 2014

(65) Prior Publication Data

US 2014/0278249 A1 Sep. 18, 2014

Related U.S. Application Data

(60) Provisional application No. 61/791,124, filed on Mar. 15, 2013.

(51) Int. Cl.
*G06F 19/00* (2011.01)
*H04H 60/32* (2008.01)
*G07C 3/00* (2006.01)
*H04H 60/33* (2008.01)

(52) U.S. Cl.
CPC ............... *H04H 60/32* (2013.01); *G07C 3/00* (2013.01); *H04H 60/33* (2013.01)

(58) Field of Classification Search
CPC ...................................................... G05B 23/00
USPC .......................................... 702/187, 182–185
See application file for complete search history.

(56) References Cited

U.S. PATENT DOCUMENTS

| | | | | |
|---|---|---|---|---|
| 6,256,019 | B1 | 7/2001 | Allport | |
| 7,739,432 | B1 | 6/2010 | Shaw et al. | |
| 7,962,315 | B2 * | 6/2011 | Jensen | B42D 15/00 702/187 |
| 8,032,472 | B2 | 10/2011 | Tsui et al. | |
| 8,392,265 | B2 | 3/2013 | Reynolds | |
| 2002/0184626 | A1 | 12/2002 | Darbee et al. | |
| 2006/0247709 | A1 | 11/2006 | Gottesman et al. | |
| 2010/0277337 | A1 | 11/2010 | Brodersen et al. | |
| 2010/0321201 | A1 | 12/2010 | Huang et al. | |
| 2011/0140867 | A1 | 6/2011 | Maier | |
| 2011/0279375 | A1 | 11/2011 | Hatambeiki et al. | |
| 2011/0282902 | A1 | 11/2011 | Zito et al. | |

FOREIGN PATENT DOCUMENTS

EP 2148308 A2 1/2010

OTHER PUBLICATIONS

ISA/US, International Search Report and Written Opinion issued on PCT Application No. US2014/018596, dated Jun. 18, 2014, 10 pages.

European Patent Office, extended European Search Report issued on European patent application No. 14770100.7, dated Feb. 18, 2016, 7 pages.

* cited by examiner

*Primary Examiner* — Edward Raymond
(74) *Attorney, Agent, or Firm* — Greenberg Traurig, LLP

(57) ABSTRACT

Usage of a universal controlling device is monitored by determining a current operating mode of the universal controlling device, sensing an event occurring within the universal controlling device, and storing within a memory of the universal controlling device data indicative of the event occurring in the current operating mode of the universal controlling device.

17 Claims, 4 Drawing Sheets

SYSTEM AND METHOD FOR MONITORING USER INTERACTIONS WITH A UNIVERSAL CONTROLLING DEVICE

RELATED APPLICATION DATA

This application claims the benefit of U.S. Provisional Application No. 61/791,124, filed on Mar. 15, 2013, the disclosure of which is incorporated herein by reference in its entirety.

BACKGROUND

U.S. Pat. No. 7,091,898 describes a remote control device is which key use is monitored. A command key, representative of an appliance function, may be correlated to a target appliance that is determined, as a function of the monitored key use, to be the most likely intended recipient of a command to perform that appliance function. An activity key may also be programmed so as to perform a series of actions that are representative of a sequence of monitored key uses.

U.S. Pat. No. 7,739,432 describes a system in which keystrokes input by a user are stored in non-volatile memory together with time stamps, creating a record of keystrokes and associated time stamps. At least some of the time stamps are generated and recorded in response to receipt of specific keystroke events, such as a specific keystroke, a specific sequence of keystrokes, a keystroke following an interval of inactivity or an interval of inactivity following a keystroke. The resulting keystroke record may show sessions of keystrokes received, with a start and end time stamp for each session. An alteration record is also provided to track alterations and erasures of the keystroke record.

U.S. Pat. No. 8,392,265 describes a system for collecting viewing data (or viewing habits) and automatically measuring the size of an audience viewing or watching a broadcast at any particular time. In the system, a remote control device may be adapted to collect and manage the collection of the viewing data on television audiences, including requests for the data from third parties. The data may be collected using a remote control device and then transmitted to a remote computer where it may be stored and accumulated, so that over time, the viewing habits of the user may be identified. The remote control device may also be used to allow a user to interact with the television to order a product, monetize advertising, participate in an auction and/or rate a television program.

U.S. Published Application No. 2011/0282902 describes a search-enabled remote control device to facilitate viewers' ability to search through programming and/or content options and view results. In one embodiment, a viewer is able to use a traditional remote control interface to navigate through menus or selections and to display search results on screen. In another embodiment, a viewer's watching behavior and/or searching habits are tracked by the search-enabled remote control and used to develop a viewer profile, which may in turn be used to target advertisements, information and/or future programming options.

Each of these publications is incorporated herein by reference in its entirety.

SUMMARY

Described herein are systems and method for monitoring user interactions with a universal controlling device. The universal controlling device may monitor the most frequently used controlling device functions and store data indicative of such monitored user interactions in local memory. When the universal controlling device is connected via a wired or wireless connection with a computer, router, or the like, the data stored in the memory may be retrieved for analysis purposes. Likewise, in the event the universal controlling device is returned for replacement, refurbishment, or the like, the data stored in the memory may be retrieved for analysis purposes.

A better understanding of the objects, advantages, features, properties and relationships of the systems and methods described hereinafter will be obtained from the following detailed description and accompanying drawings which set forth illustrative embodiments and which are indicative of the various ways in which the subject systems and methods may be employed.

BRIEF DESCRIPTION OF THE DRAWINGS

For a better understanding of the systems and methods hereinafter described, reference may be had to preferred embodiments shown in the attached drawings in which.

DETAILED DESCRIPTION

Figure 1:
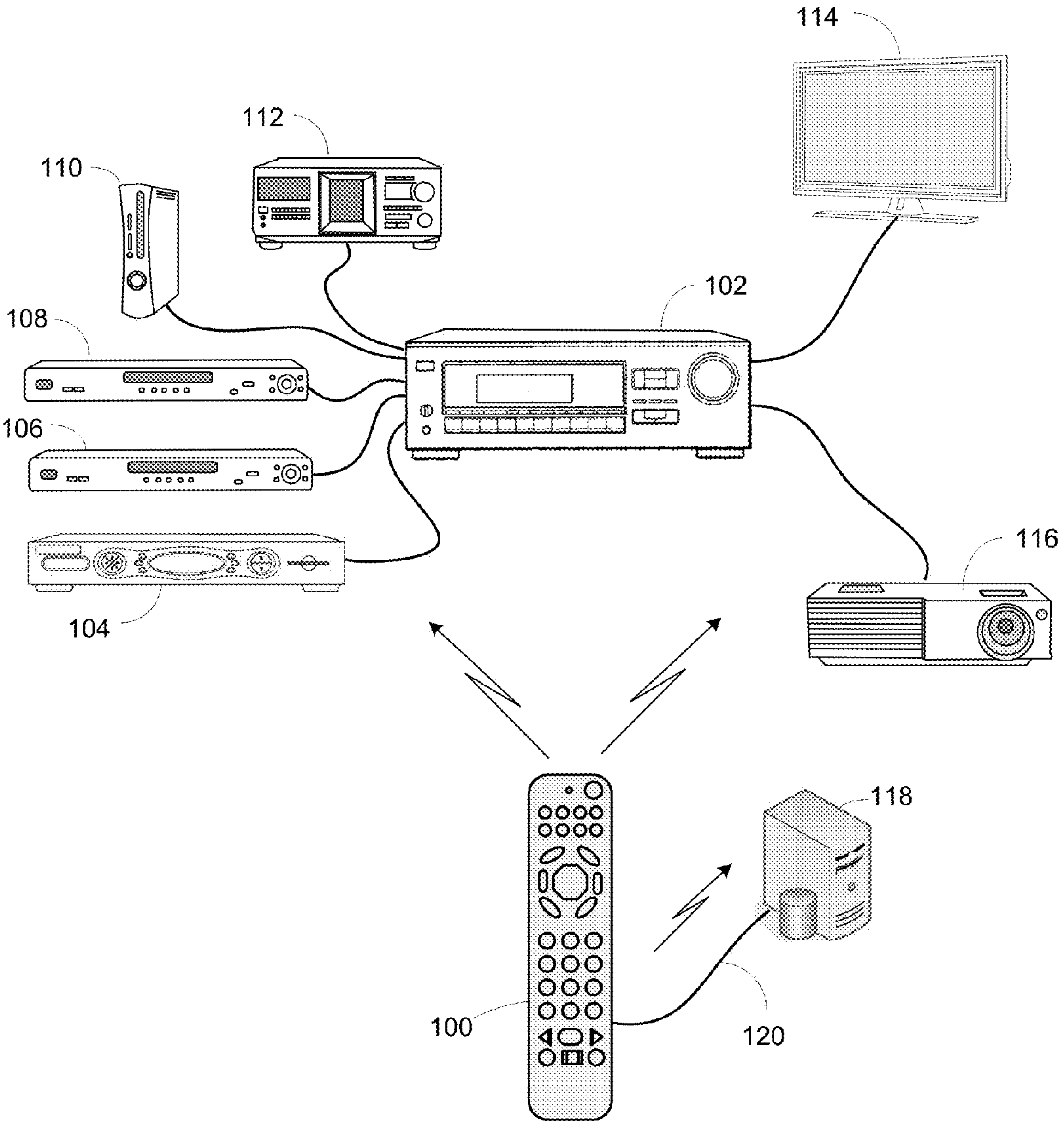
FIG. 1 illustrates an exemplary system in which a universal controlling device is used to control functional operations of one or more appliances and a system wherein the exemplary universal controlling device can be placed into communication with a personal computer for the purpose of retrieving data stored in the memory thereof.

The following describes system and methods for capturing data related to a user's interaction with a universal controlling device. By way of example, FIG. 1 illustrates an exemplary system wherein a universal controlling device 100 may be used to command functional operations of various intended target appliances such as a television 114, an AV receiver 102, a cable or satellite set top box 104, a DVD player 106 and/or 108, a game console 110, a MP3 player 116, a receiver 112, etc. In the embodiment illustrated, the universal controlling device 100 communicates with such controlled devices via a unidirectional infrared (IR) link, however, as is known in the art, controlling device 100 may be capable of communicating with these appliances using any convenient IR, RF, point-to-point, or networked protocol to cause the appliances to perform operational functions, provided the control protocols and command values to be used in communicating with a desired appliance are known to the operational software of controlling device 100.

As further illustrated in FIG. 1, universal controlling device 100 may also be periodically placed into communication with a personal computer ("PC") 118, for example via a USB connection 120, via a wireless connection such a WiFi, or other suitable connecting means, for example in order to initiate or perfect the configuration of controlling device 100. To this end, a configuration application may be executed by PC 118 which application will function to upload data from the memory of the universal controlling device 100, such as the current configuration of the universal controlling device 100 as well as data indicative of monitored user interactions with the controlling device 100, to provide a user interface on the PC 118 for display and selection of configuration options, and to download resulting new and/or modified configuration data to controlling device 100. The creation of such new or modified configuration data may include the use of data stored locally on PC 118 and/or data stored on a server that is remote from PC 118 and accessed via a wide area communication network such as the Internet. As is known in the art, the configuration application executed on PC 118 may, without limitation, take the form of a local application, a Java applet, HTML statements, ActiveX controls, etc., or any combination thereof as appropriate. Further all or parts of the various steps performed in the processes involved in generating a controlling device configuration may be performed locally on PC 118 or at a Web service hosted by a remotely located server, without limitation. While described in the context of data being retrieved from the memory of the controlling device 100 during an upgrade process, it will be understood that the data may be retrieved by being directly requested from the universal controlling device 100 or the like without limitation. It will be additionally appreciated that the retrieved data can be uploaded to the remotely located server for analysis as desired.

While illustrated in the context of a television 114, an A/V receiver 102 and a set top box 104, it is to be understood that controllable appliances may include, but are not limited to, televisions, VCRs, DVRs, DVD players, cable or satellite converter set-top boxes ("STBs"), amplifiers, CD players, game consoles, home lighting, drapery, fans, HVAC systems, thermostats, personal computers, etc. It will also be appreciated that, while in the illustrative embodiment a PC 118 is utilized to assist in the configuration of controlling device 100 and/or in the retrieval of information from the memory of the universal controlling device 100, in alternative embodiments these functions may be performed equally well by any other appliance such as, for example, a set top box. Further, while the illustrative coupling of universal controlling device 100 to the appliance is via a wired interface 120, it will be appreciated that in alternative embodiments other coupling means may be employed with equal success, for example wireless connections such as WiFi, Bluetooth, infrared transmission, etc.

Figure 2:
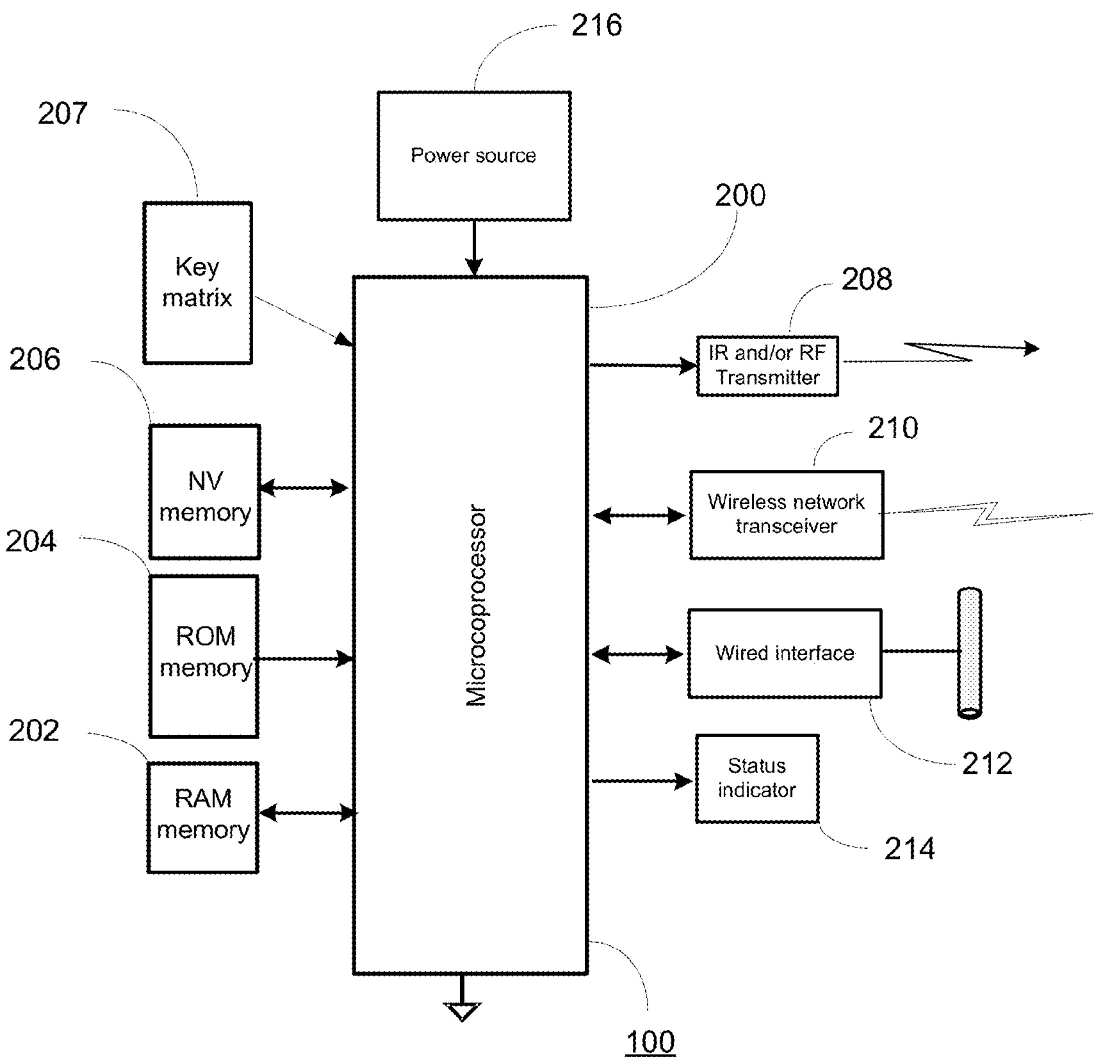
FIG. 2 illustrates a block diagram of exemplary components of the exemplary universal controlling device of FIG. 1.

With reference to FIG. 2, for use in commanding the functional operations of one or more intended target appliances, the universal controlling device 100 may include, as needed for a particular application, a processor 200 coupled to a ROM memory 204, a RAM memory 202, a key matrix 207 (e.g., hard keys, soft keys such as a touch sensitive surface overlaid on a liquid crystal (LCD) or an electroluminescent (EL) display, or some combination thereof), a transmission circuit 208 with an associated IR and/or RF emitter, a non-volatile read/write memory 206, a means 214 to provide feedback to the user (e.g., one or more visible LEDs, LCD display, speaker, backlighting, and/or the like), a power source 216, a wired input/output port 212 such as a serial interface, modem, USB port, etc., a wireless interface 210, and clock and timer logic with associated crystal or resonator.

As will be understood by those skilled in the art, some or all of the memories 202, 204, and 206 may include executable instructions (collectively, the program memory) that are intended to be executed by the processor 200 to control the operation of the universal controlling device 100, as well as data that serves to define the aforementioned control protocols and command values to the operational software (collectively, the command data). In this manner, the processor 200 may be programmed to control the various electronic components within the universal controlling device 100, e.g., to monitor the power supply 216, to cause the transmission and reception of signals, control visual feedback device(s) 214, etc. All or part of the non-volatile read/write memory 206, for example an EEPROM, battery-backed up RAM, FLASH, Smart Card, memory stick, or the like, may additionally be used to store setup data and parameters, data indicative of monitored user interactions with the universal controlling device 100, etc. as necessary. While the memory 204 is illustrated and described as a ROM memory, memory 204 may also be comprised of any type of readable media, such as ROM, FLASH, EEPROM, or the like. Preferably, the memories 202 and 206 are non-volatile or battery-backed such that data is not required to be reloaded after battery changes. In addition, the memories 202, 204 and 206 may take the form of a chip, a hard disk, a magnetic disk, an optical disk, and/or the like. Still further, it will be appreciated that some or all of the illustrated memory devices may be physically incorporated within the same IC chip as the microprocessor 200 (a so called "microcontroller") and, as such, they are shown separately in FIG. 2 only for the sake of clarity.

To cause the universal controlling device 100 to perform an action, universal controlling device 100 is adapted to be responsive to events, such as a sensed user interaction with the key matrix 207, etc. In response to an event, appropriate instructions within the program memory (hereafter the "operating program") may be executed. For example, when a function key is actuated on the controlling device 100, the universal controlling device 100 may retrieve from the command data stored in memory 202, 204, and/or 206 the command value and control protocol currently assigned to the actuated function key and the currently assigned device mode to thereby transmit a command to an intended target appliance, e.g., the STB 104 or the TV 114, in a format recognizable by the intended target appliance. It will also be appreciated that the operating program can be used not only to cause the transmission of command codes and/or data to the appliances, but also to perform local operations. While not limiting, local operations that may be performed by the universal controlling device 100 may include displaying information/data, favorite channel setup, macro key setup, function key relocation, etc. Examples of local operations can be found in U.S. Pat. Nos. 5,481,256, 5,959,751, and 6,014,092. In accordance with this disclosure, an additional local operation is the ability to monitor user interactions with the universal controlling device 100, to store data indicative of such monitored user interactions with the universal controlling device 100, and to upload such stored data, as applicable, to a connected appliance (or directly to an Internet server).

Figure 3:
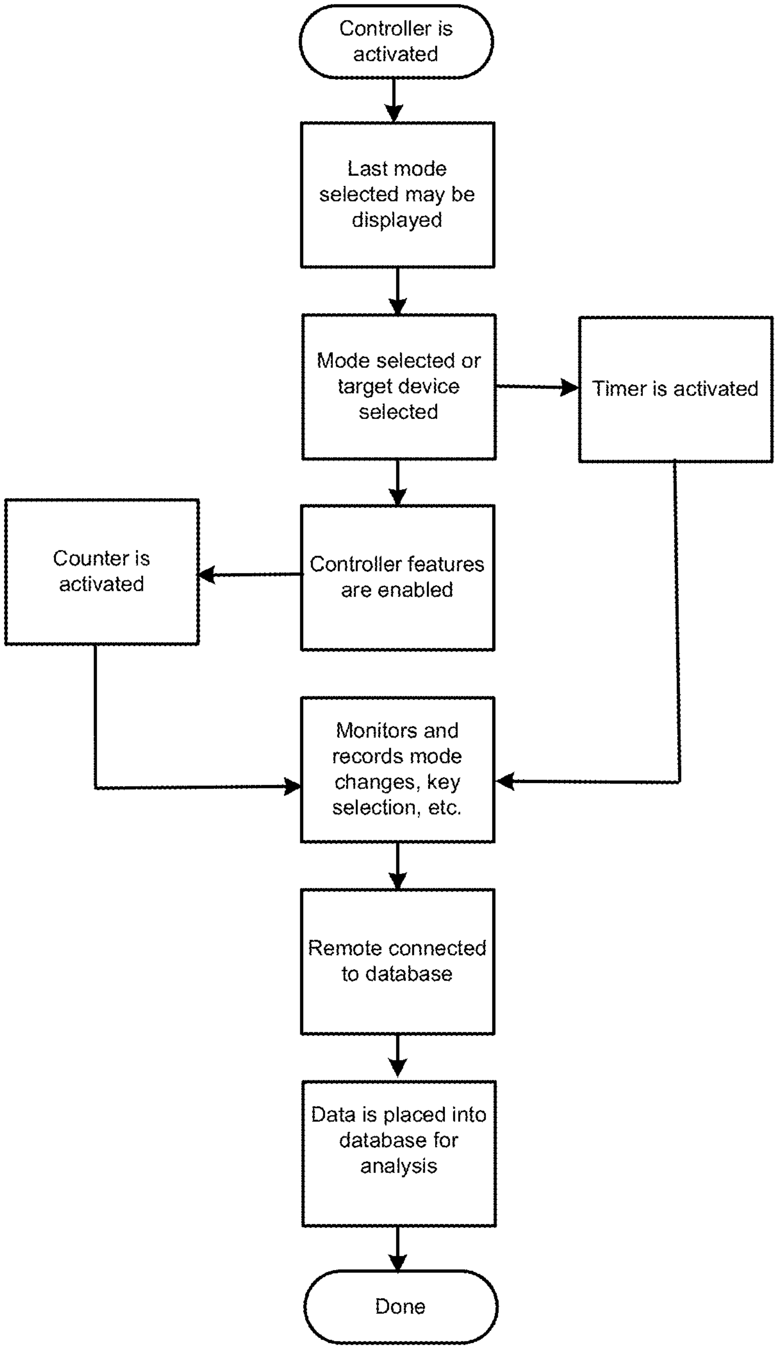
FIG. 3 is a flow chart of an exemplary method for monitoring user interaction with the exemplary universal controlling device of FIG. 1.
Figure 4:
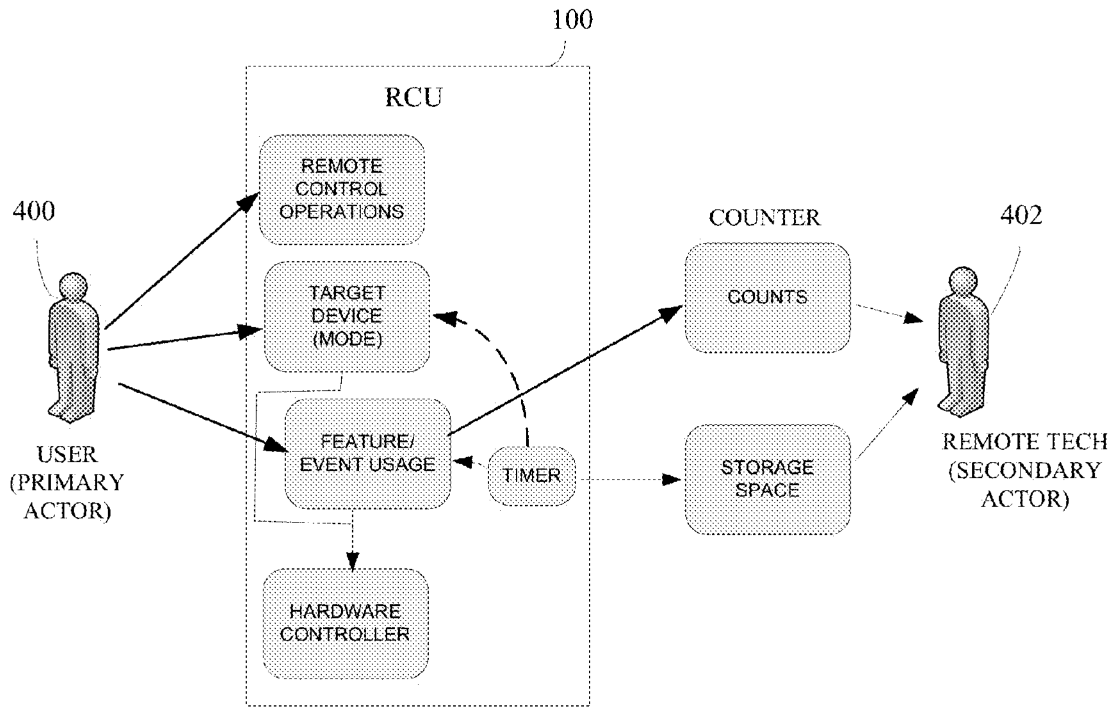
FIG. 4 is an exemplary use case diagram.

Turning now to FIGS. 3 and 4, in a use case of the system a user 400 (e.g., the primary actor) interacts with the universal controlling device 100 to, for example, cause the transmission of commands for controlling functional operations of an intended target device, place the universal controlling device 100 into an operating mode for identifying which command code set(s) to use when issuing transmissions of commands for controlling functional operations of an intended target device(s), etc. During such usage of the universal controlling device 100 by the user, the universal controlling device 100 will monitor the user's interactions with/events occurring within the universal controlling device 100 and store data indicative of such usage/events in its memory for later retrieval by, for example, a secondary actor 402, such as a technician. By way of example, as soon as user starts using the universal controlling device 100 (e.g., lifts the universal controlling device, activates a key of the universal controlling device 100, or otherwise causes the universal controlling device 100 to exit a quiescent or sleep state) a timer (e.g., a real time clock or relative time keeper) can be used, for example, to provide a time stamp to data which is indicative of the current operating mode of the universal controlling device 100. During usage, the time at which the universal controlling device 100 is placed into other modes via activation of a mode key, e.g., the TV mode, SAT mode, etc, keys, if any, is similarly used to timestamp the relevant captured data in this same manner. Any such captured data would then be stored in the memory of the universal controlling device. Furthermore, when a user activates other keys of the universal controlling device 100 in the current operating mode of the universal controlling device 100, e.g., the "power on" key, time stamped data indicative of such other key activations could also be stored in the memory of the universal controlling device 100. In this manner, an accurate record is maintained of the various operating modes into which the universal controlling device 100 has been placed, the functionalities of the universal controlling device 100 that were used in this mode of operation 100, and the times at which such actions took place (and the time in between such actions which might be indicative of, for example, how long a TV was tuned to a particular channel, how long the TV was turned on, how long the universal controlling device 100 was in a given mode of operation, or the like). Time stamped data indicative of the universal controlling device 100 being returned to a quiescent/sleep state could also be captured to provide an indication of universal controlling device 100 idle time. Still further, time stamped data could be captured and stored for other events, such as an accelerometer sensed movement of the universal controlling device 100, the universal controlling device 100 being in communication with an appliance or the Internet, etc. as needed for any intended purpose. Accordingly, these examples in which events are sensed and recorded are not intended to be limiting.

In a further embodiment, a counter could be used to merely count the number of times a user interacted with/an event occurred within the universal controlling device 100 in, for example, a given mode of operation of the universal controlling device 100. For example, a counter associated with a channel up command in a "TV mode" of operation can be incremented each time the user interacts with the channel up command in the "TV mode" of operation. In this example, the data indicative of a number of times a functionality was used (or event generated) in the various modes of operation of the universal controlling device 100 need not be provided with timestamps.

It will additionally be appreciated that is some cases it might be desirable to capture some data using counters and/or to capture some data with timestamps. It will also be appreciated that is some cases it may not be necessary to correlate usage of a particular function or event to a given mode of operation of the universal controlling device 100 and that cumulative (as opposed to mode specific) usage data for such functionalities/events could be captured.

As discussed above, when universal controlling device 100 is placed into communication with (or received at), for example, a servicing center, the data stored in the memory of the universal controlling device 100 can be retrieved therefrom. At this time, the data stored in the memory could be erased to thereby free the memory for use in storing future usage data. In cases where the memory of the universal controlling device 100 is limited, it may also be desired to store the most currently captured data while overwriting the oldest captured data.

Once the data is retrieved from the memory of the universal controlling device 100, the data could be analyzed to, for example:

- discern ways to improve access to features/functionalities that are used frequently;
- discern which appliances are being used, how often they are being used, when they are being used, how they are being used in a home theater environment, etc. to provide solutions for command functional operations of such appliances;
- discern ways to improve the ergonomics of the universal controlling device 100; and/or
- discern interests of the user of the universal controlling device 100 (to thereby target the user with advertising, promotions, etc.);

It is to be understood that these exemplary usages are not intended to be limiting.

It is also contemplated that the user interaction data can be further stamped with/correlated with data that is indicative of a specific user of the universal controlling device 100. To this end, the universal controlling device 100 can have a biometric sensor, an image recognition system, a log-in system or the like for use in identifying a current operator of the universal controlling device 100 (as well as others in the area of the universal controlling device 100 as desired). This optionally collected user identifying data can also be retrieved from memory as described above and then used (with the other collected data) to, for example, discern usage patterns of the universal controlling device 100 and/or target appliances by persons in various age groups, gender groups, or the like for the various purposes noted above.

While various concepts have been described in detail, it will be appreciated by those skilled in the art that various modifications and alternatives to those concepts could be developed in light of the overall teachings of the disclosure. For example, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A method for monitoring usage of a universal controlling device, comprising:

determining a one of a plurality of operating modes in which the universal controlling device is currently operating;

sensing an event occurring within the universal controlling device; and storing within a memory of the universal controlling device data indicative of the sensed event whereby the stored data is available for analysis;

wherein the data indicative of the sensed event is generated via use of a counter and the counter functions to track each time the sensed event occurs within the universal controlling device only during such time as the universal controlling device is operating in the determined one of the plurality of operating modes of the universal controlling device.

2. The method as recited in claim 1, wherein the sensed event comprises a sensed activation of at least one command key of the universal controlling device.

3. The method as recited in claim 1, wherein the sensed event comprises a sensed movement of the universal controlling device.

4. The method as recited in claim 1, wherein the event comprises a sensed receipt of a signal by the universal controlling device.

5. The method as recited in claim 1, wherein the event comprises a sensed establishment of a communication connection between the universal controlling device and an appliance.

6. The method as recited in claim 1, wherein the event comprises the universal controlling device entering a quiescent state.

7. The method as recited in claim 1, comprising tracking a time in which the universal controlling device stays within the determined one of the plurality of operating modes of the universal controlling device.

8. The method as recited in claim 1, comprising determining a current user of the universal controlling device and storing data indicative of the current user of the universal controlling device in association with the data indicative of the sensed event.

9. The method as recited in claim 8, comprising using a log-in feature to determine the current user of the universal controlling device.

10. The method as recited in claim 8, comprising using a biometric sensor to determine the current user of the universal controlling device.

11. The method as recited in claim 8, comprising using an image recognition feature to determine the current user of the universal controlling device.

12. The method as recited in claim 1, wherein the universal controlling device comprises a smart phone.

13. The method as recited in claim 1, wherein the universal controlling device comprises a tablet computing device.

14. The method as recited in claim 1, wherein the data is analyzed to discern ways to improve access to features/functionalities that are used frequently on the universal controlling device.

15. The method as recited in claim 1, wherein the data is analyzed to discern ways to improve access to features/functionalities of appliances that are commonly accessed via use of the universal controlling device.

16. The method as recited in claim 1, wherein the data is analyzed to determine interests of an operator or operators of the universal controlling device.

17. The method as recited in claim 1, wherein the data is analyzed to discern how often appliances are being used.

* * * * *